United States Patent Office 3,705,244
Patented Dec. 5, 1972

3,705,244
AMINO ALCOHOLS IN COMPOSITIONS HAVING BRONCHIAL SPASMOLYTIC ACTIVITY
Roland-Yves Mauvernay, Rte. de Marsat, 63 Riom, France, and Norbert Busch, Riom, France; said Busch assignor to said Mauvernay
No Drawing. Continuation-in-part of abandoned application Ser. No. 654,028, June 22, 1967. This application Feb. 9, 1971, Ser. No. 114,026
Claims priority, application Great Britain, June 27, 1966, 28,801/66
Int. Cl. A61k 27/00
U.S. Cl. 424—250    10 Claims

ABSTRACT OF THE DISCLOSURE

Compositions for the treatment of bronchitis and asthma comprising aminoalcohols of the formula:

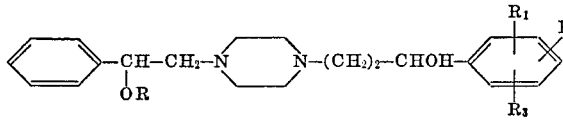

wherein R is a lower alkyl radical, $R_1$, $R_2$ and $R_3$ are independently selected from the group consisting of a hydrogen atom, a halogen atom, an alkyl radical, an alkoxy radical, an alkenyloxy radical, and a 2-amino-alkoxy radical. The compositions are in the form of injectable ampoules, tablets, suppositories or aerosols.

CROSS-REFERENCE TO RELATED APPLICATIONS

This is a continuation-in-part of application Ser. No. 654,028, filed June 22, 1967 now abandoned.

BACKGROUND OF THE INVENTION

Field of the invention

The present invention relates to medicinal compositions containing a new class of chemical compounds, particularly remarkable for their physiological properties which are useful in human medicine, and to their applications in the medical field.

Prior art

The compounds most closely related to those which are used in the present compositions are those which are disclosed in Mauvernay, U.S. Pat. 3,448,192. However the known compounds are all ketones while the compounds used in the present invention are alcohols.

DETAILED DESCRIPTION

The chemical compounds used in the invention are new products per se and have the following general formula:

(I)

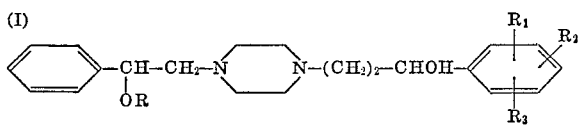

wherein R is a lower alkyl radical, either branched or straight chain, such as methyl, ethyl, propyl, iso-butyl or isopentyl, $R_1$, $R_2$ and $R_3$ are independently selected from the group consisting of hydrogen atom, halogen atom, such as fluorine, and chlorine, an alkyl radical, such as butyl, an alkoxy radical, such as methoxy, an alkenyloxy radical, such as allyloxy, and a 2-amino-alkoxy radical, such as 2-piperidinoethoxy.

All these compounds have the peculiarity of possessing a high bronchial spasmolytic activity, which may be advantageously used particularly in the treatment of chronic bronchitis with emphysema and of asthma in all its forms.

These compounds are obtained from styrene according to a method which comprises four stages, namely, Stage 1.—Preparation of (2-phenyl, 2-alkoxy)-ethyl-bromide, by alkoxy-bromination of styrene by means of tertiary-butyl hypobromite, in an alkanol ROH, wherein R is as defined above.

Stage 2.—Preparation of 1-(2-phenyl, 2-alkoxy)-ethyl-piperazine, by the action of piperazine on the product resulting from stage 1.

Stage 3.—Mannich reaction between the product resulting from stage 2, formaldehyde and acetophenone bearing substituents corresponding to $R_1$, $R_2$ and $R_3$ defined as above.

Stage 4.—Reduction of the product resulting from stage 3 by means of sodium borohydride.

This method may be illustrated by the following diagram.

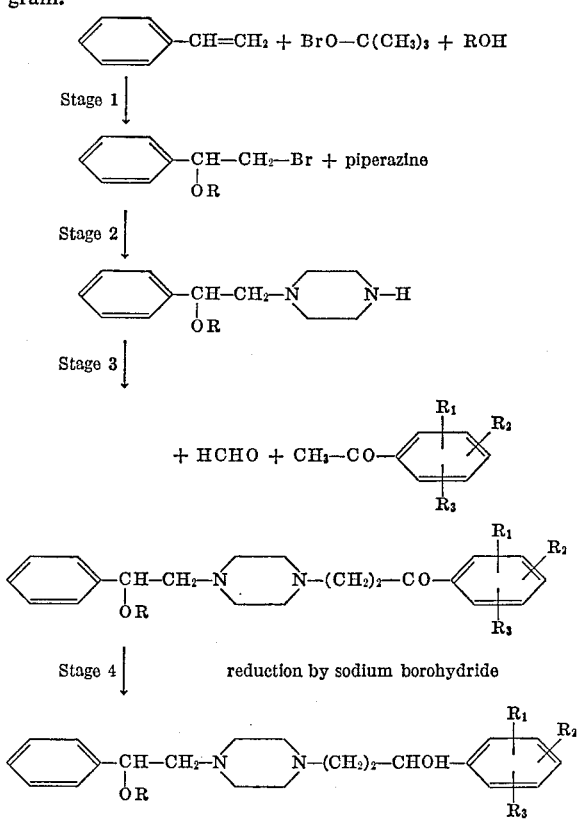

By way of example of the instant compounds the most interesting pharmacodynamic properties have been ground in the following tables, for given definitions of the substituents R, $R_1$, $R_2$ and $R_3$.

Table I thus shows the identification of 17 compounds, and Table II the results of the following pharmacodynamic experiments.

(A) Acute toxicity—$LD_{50}$.—Method of B. Bherens and C. Karber (Arch. f. Exp. Path. Pharm. 177; 397–1935), orally in the mouse, expressed in mg./kg.

(B) Analgesic activity.—This has been demonstrated by two methods.

(a) Caloric stimulus: method of Eddy N. B. and Leimbach D. (J. Pharmacol. Exp. Ther. 107; 385–393, 1953)

(b) Chemical stimulus: method of Koster modified by Witkin. (Koster R., Anderson M. De Beer E. J. Fed. Proc. 18; 412 (1959) Witkin L. B., Heubner C F. Galdi F., O'Keefe E., Spitaletta P. and Plummer A. J. J. Pharmacol. Exp. Ther. 133; 400–408 (1961)

(C) Broncho-spasmolytic action.—This has been studied by the method of protection against the bronchospasm created by histamine aerosol in the guinea pig.

(D) General sedation.—This has been determined:

by a study of the potentiation of barbiturate narcosis,
by a study of the anti-convulsant action with respect to cardiazol and strychnine,
by a study of the spontaneous motility, and
by a study of the compartment of the animals (chimney test, evasion test).

(E) Anti-tussive effect—Method of Domenjoz R. (Arch. Exp. Pathol. u. Pharmakol. 215; 19 (1952).—The results obtained by these different tests are given according to the following symbols:

++++: very active
+++: active
++: average activity
+: slight activity
0: inactive.

(F) Anti-inflammatory actions—Kaolin Test.—This has been studied by the kaolin oedema test in the rat (Wilhelmi G. and Domenjoz R. Arzneimittel Forsch 1; 151 1951).

The results are expressed by the percentage of inhibition of oedema in the treated animals compared with control animals.

(G) The general effects were studied in the anesthetised dog and rabbit by recording the arterial pressure, the respiratory rhythem, the intestinal motility,
by a study of the adrenaline and noradrenaline hypertension and the cardiomoderation induced by stimulation of the peripheral end of the pneumo-gastric nerve.
by a study of the histaminic hypotension.

The results are expressed in the following manner:

TA=arterial pressure
A=adrenaline hypertension
NA=noradrenaline hypertension
X=cardiomoderation induced by stimulation of the pneumo-gastric nerve
HIST=for the study of the histaminic hypotension.

TABLE I

| Compound No. | R | $R_1$ | $R_2$ | $R_3$ | $n$ | M.P. (° C.) dihydrochloride |
|---|---|---|---|---|---|---|
| 1 | $-C_2H_5$ | H | H | H | 2 | 167 |
| 2 | $-C_2H_5$ | p.F | H | H | 2 | 189 |
| 3 | $-C_2H_5$ | $p.O-CH_2-CH=CH_2$ | H | H | 2 | 170 |
| 4 | $-CH_3$ | $p.O-(CH_2)_2-N$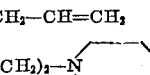 | H | H | 2 | [1] 198 |
| 5 | $-CH_2-CH(CH_3)_2$ 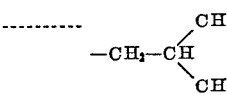 | p.Cl | H | H | 2 | 156 |
| 6 | $-CH_2-CH(CH_3)_2$ 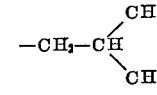 | p.F | H | H | 2 | 168 |
| 7 | $-(CH_2)_2-CH(CH_3)_2$ 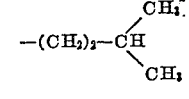 | $p.OCH_3$ | $o.OCH_3$ | H | 2 | [2] 185 |
| 8 | $-CH_3$ | $p.OCH_3$ | $m.OCH_3$ | $m.OCH_3$ | 2 | 173 |
| 9 | $-CH_3$ | H | H | H | 2 | 168 |
| 10 | $-C_2H_5$ | $p.OCH_3$ | H | H | 2 | 183 |
| 11 | $-C_2H_5$ | $p.(n)C_4H_9$ | H | H | 2 | 175 |
| 12 | $-CH_3$ | $p.(n)C_4H_9$ | H | H | 2 | 173 |
| 13 | $-CH_3$ | $p.OCH_3$ | H | H | 2 | 169 |
| 14 | $-CH_3$ | p.Cl | H | H | 2 | 183 |

[1] Trichloride, [2] Dimaleate.

TABLE II

| Compound No. | $LD_{50}$, p.o. (mg./kg.) | Analgesia Plate, $ED_{50}$ (mg./kg.) | Analgesia Acid, $ED_{50}$ (mg./kg.) | Bronchospasmolytic action, $ED_{50}$ (mg./kg.) | Antitussive action | Antiinflammatory action test with kaolin, percent | General effects | General sedation action SNC |
|---|---|---|---|---|---|---|---|---|
| 1 | 438 | I | I | 10 | I | | ↓A | I |
| 2 | 430 | S.A. | I | 25 | 0 | 22 | ↓A | ++ |
| 3 | 435 | S.A. | S.A. | 4 | 0 | | R.A.S. | + |
| 4 | 1750 | I | I | ≃75 | ++++ | 24 | R.A.S. | + |
| 5 | 709 | S.A. | 125 | 10 | I | | R.A.S. | I |
| 6 | >1500 | 60 | 100 | ~15 | +++ | 66 | R.A.S. | ++ |
| 7 | >3000 | I | I | S.A. | +++ | 35 | ↓A-NA | +++ |
| 8 | 709 | S.A. | S.A. | 8.5 | 0 | 30 | R.A.S. | + |
| 9 | 500 | I | S.A. | 3.5 | | | ↓HIST | ++ |
| 10 | 552 | I | S.A. | 10 | ++++ | | ↓HIST ↓A | ++ |
| 11 | ~1000 | S.A. | 150 | ~8 | | 40.5 | ↓HIST ↓A ↓NA→X | 0 |
| 12 | 1000 | S.A. | 100 | 4 | 0 | 34 | ↓HIST ↓X | ++ |
| 13 | 656 | S.A. | S.A. | 5 | I | | TA. NA A→ | +++ |
| 14 | 718 | | | 2.5 | I | | R.A.S. | |

In Table II, the notations I and S.A. have the following arbitrary designations:

I=inactice
S.A.=sub-active.

In order to understand the difference between these two designations, it is necessary to consider that a product is judged inactive, when regardless to the number of animals treated, no difference is ascertained between the animals treated and the control animals, whatever the dose may be, while it is considered that a product is sub-active when the $ED_{50}$ is very high, but when certain animals manifest a certain reaction even then. Thus is the case of analgesia the product is considered sub-active if the $ED_{50}$ is higher than 500 mg./kg. but if there is an $ED_{25}$; similarly, for bronchospasm the product is considered sub-active if its $ED_{50}$ is higher than one tenth of its $LD_{50}$.

The invention will now be illustrated by a detailed description of the method of preparing certain of the preceding compounds.

EXAMPLE 1

Preparation of 1 - (2-phenyl-2-methoxy)-ethyl-4-(3-phenyl-3-hydroxy) propyl-piperazine (dihydrochloride)—(Compound No. 9)

Stage 1: preparation of [2-phenyl, 2-methoxy]ethyl bromide.—1.3 moles terbutyl hypobromite are added slowly and with agitation to a mixture of 107 g.; 1 mole of vinylbenzene and 250 ml. of methanol (99 percent), kept at −10° C. When the addition of the reactant is finished, the mixture is allowed to return to ambient temperature, it is washed in water, and dried on anhydrous $Na_2SO_4$.

Rectification is effected in vacuo in order to obtain a colorless liquid $E_{12}=113°$ C. $E_{2.5}=84°$ C. $N_D^{20.6}=1.5429$ $R^{dt}=76$ percent.

Stage 2: preparation of 1-[2-phenyl, 2-methoxy] ethyl-piperazine.—210 g. of [2-phenyl, 2-methoxy] ethyl bromide, and 260 g. of anhydrous piperazine are heated for 5 and 6 hours to reflux in 600 ml. of ethanol, 500 ml. of ethanol are then distilled off and finally solvent is removed in vacuo. It is taken up in 250 ml. of benzene, and the piperazine hydrobromide is filtered. The benzene is removed in vacuo. The oily residue is taken up by 450 ml. of water, and acidification is effected to pH=1 with concentrated HCl. The aqueous solution is filtered; the latter is then made alkaline with 50% aqueous NaOH. The liberated base is decanted, the alkaline aqueous solution is washed twice with 150 ml. ether. After distillation of the ether, the previously decanted oils is added to the residue and distillation is effected in vacuo. Thus 135 g. of a colorless viscous oil, becoming carbonated in air, is obtained.

$E_{14} = 166°$ C. $n_D^{20°}=1.5321$ $R^{dt}=61\%$.

Stage 3: preparation of 1-[2-phenyl, 2-methoxy] ethyl 4-[3-phenyl propane-3-one] piperazine dihydrochloride.—There are heated to reflux and with agitation for 6 hours:

| | | |
|---|---|---|
| 1-[2-phenyl, 2-methoxy] ethyl piperazine | g | 166 |
| Ethanol 96% | ml | 400 |
| Absolute ethanol with 23% HCl gas | ml | 260 |
| Acetophenone | g | 112 |
| Trioxymethylene | g | 32 |
| Concentrated aqueous HCl | ml | 0.8 |

After cooling, the product crystallizes.

Recrystallization is effected in 96% ethanol (1.400 liters for the quantity indicated).

246 g. of a white crystalline powder is thus obtained, slightly soluble in water and alcohol.

M.P. (inst.)=168° C. with decomposition $R^{dt}:77\%$.

Stage 4: preparation of 1-[2-phenyl, 2-methoxy] ethyl 4-[3-phenyl 3-hydroxy] propyl piperazine hydrochloride.—In a double-neck flask equipped with a thermometer and a mechanical stirrer, there are placed in suspension in 800 ml. of ethanol, 233 g. of 1-[2-phenyl, 2-methoxy] ethyl 4-[3-phenyl propane-3-one] piperazine dihydrochloride (0.55 mole).

It is cooled to about 5° C.; 46 g. of NaOH pellets dissolved in 80 ml. $H_2O$, are added.

When the temperature is about 5° C. one addition of 29.2 g. of sodium borohydride in 40 ml. $H_2O$ is made.

The ice-bath is then removed and stirring continued at ambient temperature for 6 hours.

Cooling is effected in the ice-bath while slowly adding concentrated HCl, while maintaining the temperature around 5°, up to pH 2.

It is filtered and an equal volume of $H_2O$ is added. If the solution is cloudy it is washed in ether.

It is alkalized with aqueous NaOH of about 40%, and the oil formed is extracted with ether.

The ether phase is washed with water saturated with NaCl then it is dried over anhydrous $Na_2SO_4$.

After evaporation of the solvent, a very thick, colorless oil is obtained. This base is dissolved in 200 ml. of absolute ethanol and the quantity of HCl necessary to obtain the dihydrochloride is added.

It is left for a few hours over ice, dried, washed with about 100 ml. of anhydrous ether in order to obtain 190–195 g. of 1-[2-phenyl, 2-methoxy] ethyl 4-[3-phenyl 3-hydroxy] propyl piperazine dihydrochloride after drying at 60° in vacuo. $R^{dt}=80\%$.

It is recrystallized from absolute ethanol.

The product is in the form of white crystalline powder, soluble in water, slightly soluble in alcohol, insoluble in ethyl acetate.

EXAMPLE 2

Preparation of 1 - (2 - phenyl-2-isobutoxy)ethyl-4-[3-(4-fluoro) - 3 - hydroxy] propyl-piperazine (dihydrochloride)—Compound No. 6

The same procedure is followed as in Example 1:

First stage: preparation of [2-phenyl, 2-isobutoxy] ethyl bromide.—To a mixture of 130 g. of vinylbenzene and 300 ml. of isobutanol, there are slowly added, while maintaining the temperature close to −10°, 1.6 moles of terbutyl hypobromite.

Concentration is effected in vacuo at 15 mm. Hg. The residue is washed several times in water and dried over anhydrous $Na_2SO_4$.

Rectification is effected in vacuo in order to obtain a colorless liquid.

$E_{0.5}=83°$ C. $n_D^{20.2°}=1.5222$ $R^{dt}=66\%$.

Second stage: preparation of the 1-[2-phenyl, 2-isobutoxy] ethyl piperazine.—Exactly the same mode of operation as in the second stage of Example 1 is followed, by reacting (2-phenyl-2-isobutoxy) ethyl-bromide with piperazine.

Third and fourth stages.—The Mannich reaction is then effected, then the reduction under the same operational conditions as in Example 1, and compound No. 6 is obtained, with a M.P.=168° C.

EXAMPLE 3

Preparation of 1-(2-phenyl - 2 - ethoxy)-ethyl-4-[3-(4-fluoro) phenyl-3-hydroxy] propyl-piperazine (dihydrochloride)—Compound No. 2

Stage 1.—Stage 1 of Example 1 is repeated with the methanol replaced by ethanol.

Stage 2.—The reaction with piperazine is conducted as in Example 1, in order to obtain 1-(2-phenyl-2-ethoxy) ethyl-piperazine.

Stage 3.—23.4 g. of the product resulting from Stage 2 is reacted with 15.2 g. of p-fluoro-acetophenone and 3.3 g. of trioxymethylene. After recrystallization from ethanol, 32 g. of the corresponding aminoketone, (dihydrochloride) is obtained, M.P.=164° C.

Stage 4.—22.87 g. of the aminoketone are then reduced by 39 g. of sodium borohydride in aqueous alkaline methanol, under the same conditions as in Example 1. There are thus obtained 19.5 g. of the final product, in the form of the dihydrochloride (M.P.=189° C.).

EXAMPLE 4

Preparation of the 1-(2-phenyl-2-ethoxy) ethyl-4 [3-(4-methoxy) phenyl-3-hydroxy] propyl-piperazine (dihydrochloride)—Compound No. 10

Stages 1–2.—Identical to Stages 1 and 2 of Example 3.

Stage 3.—The corresponding ketone is prepared as previously, by reaction of 23.4 g. of the 1-(2-phenyl-2-ethoxy) ethyl-piperazine, obtained in Stage 2, with 16.5 g. of p-methoxy-acetophenone and 3.3 g. of trimethoxy-methylene. After recrystallization, 29.5 gms. of aminoketone are obtained in the form of the dihydrochloride (M.P.=162° C.).

Stage 4.—23.45 g. of the 1-(2-phenyl-2-ethoxy)-ethyl-4-[3-(4-methoxy) phenyl-propane-3-one] piperazine thus prepared is reduced by means of 2.9 g. of sodium borohydride, under the same conditions as in Example 1. 18 g. of the final product is obtained in the form of dihydrochloride (M.P.=183° C.).

As has been indicated above and as a result of the preceding pharmacodynamic elements, all the compounds belonging to the family according to the invention possess broncho-spasmolytic properties and are consequently useful in human therapeutics in various administratable forms namely injectable ampoules, tablets, suppositories or aerosols, in the preparation of which, the usual pharmaceutical excipients are used.

The dose administered to humans are extremely variable, the toxicity of these compounds being very slight, this enabling them to be used in quantities corresponding to the degree of action which it is desired to achieve.

Thus, injectable ampoules, each containing 5 or 10 mg. of the active compound, tablets containing 25, 50 or 100 mg. of the active compound, suppositories containing 50 or 100 mg. of the active compound can be prepared; in the form of aerosols, quantities can be used which ensure the inhalation of 4 to 10 mg. per dose.

There will next be given several examples of the preparation of the instant compositions in each of the above-mentioned forms.

EXAMPLE 5

Tablet form (for 400,000 tablets)

In a planetary mixer, the following ingredients are mixed for 15 minutes:

| | Kg. |
|---|---|
| 1-(2-phenyl 2-methoxy)ethyl 4-(3 hydroxy-3 phenyl) propyl piperazine dichlorhydrate (compound No. 9) | 20 |
| Lactose | 22 |
| Corn starch | 28 |
| Celluose | 36 |

Add 30 liters of 50% alcohol and stirred to a homogenous mass. The mass is granulated on an oscillating granulator through a normal 32 AFNOR screen.

The granulate is dried and there is added:

| | Kg. |
|---|---|
| Cellulose | 12 |
| Magnesium stearate | 2 |

The materials are mixed with a cubic mixer and then compressed with a 10 mm. diameter die to obtain tablets of 300 mg. total weight.

This technique is usable for all the above compounds but particularly compounds 3, 8 and 9.

EXAMPLE 6

Suppository form (for 50,000 suppositories)

| | Kg. |
|---|---|
| 1-(2 phenyl 2-ethoxy)ethyl 4-(3 hydroxy-3-(4 fluoro) phenyl propyl piperazine dichlorhydrate (compound No. 2) | 5 |
| Semi-synthetic glycerides | 87 |

The semi-synthetic glycerides are melted at a temperature approximating 60° C. The 1-(2-phenyl 2-ethoxy) ethyl 4-(3-hydroxy-3-(4 fluoro) phenyl) propyl piperazine dichlorohydrate is screened on an AFNOR screen 28. The products are mixed and refined in an emulsifier up to a satisfactory dispersion. The temperature is thermostatically set at 35–36° C. and the mix poured into refrigerated mold cavitiies of a capacity approximately 1.8 gm.

This technique is usable for all compounds of the group, particularly compounds 2 and 6.

EXAMPLE 7

Syrup form (for 1,000 liters) at 5 mg./ml. dosage

| | | |
|---|---|---|
| 1-(2 phenyl 2 ethoxy) ethyl 4-(3 hydroxy 3-(4 chloro)phenyl) propyl piperazine dichlorhydrate (compound No. 14) | kg | 5 |
| White disperser—sugar | kg | 843 |
| Strawberry alcoholate | liters | 2 |
| Sodium methyl paraoxybenzoate | kg | 0.5 |
| Potable water q.s.p. | liters | 1,000 |

Into a vat having a high-speed mixing turbine, introduce about 100 liters of water. Dissolve therein the 1-(2 hpenyl 2 ethoxy) ethyl 4-(3 hydroxy 3-(4 chloro) phenyl) propyl piperazine dichlorhydrate.

Add the sugar and a minimum quantity of water for dissolving it.

Add the sodium methyl paraoxybenzoate, previously dissolved, and then the strawberry alcoholate.

Stir while adding the complement up to 1,000 liters of water.

When the mixture is homogeneous, it is filtered on cellulose filter disks.

EXAMPLE 8

Ampoule form (for 120 liters) at 2 mg./ml. dosage

| | | |
|---|---|---|
| 1-(2 phenyl 2 methoxy) ethyl 4-(3 hydroxy 3 - phenyl) propyl piperazine dichlorhydrate (compound No. 1) | kg | 0.240 |
| Sodium chloride | kg | 1.020 |
| Distilled water q.s.p. | liters | 120 |

Dissolve the sodium chloride and 1-(2 phenyl 2 methoxy) ethyl 4-(3 hydroxy 3-phenyl) propyl piperazine dichlorhydrate in 100 liters distilled water suitable for parenteral injections.

Add water to 120 liters, stir and filter on an Anrep 2 (plastic membrane) and sterilize to 110° C. for 30 minutes in an autoclave.

What is claimed is:

1. A composition comprising a therapeutically effective amount of a compound having the formula:

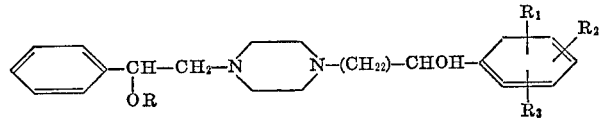

wherein R is an alkyl radical having 1 to 5 carbon atoms $R_1$, $R_2$ and $R_3$ are independently selected from the group consisting of a hydrogen atom, a halogen atom, an alkyl radical having 1 to 4 carbon atoms, a methoxy radical, an alkenyloxy radical having less than 3 carbon atoms, and a 2-amino-alkoxy radical in which the alkoxy has less than three carbon atoms, and a pharmaceutically acceptble carrier.

2. A composition according to claim 1 in the form of an injectable solution.

3. A composition according to claim 2 wherein the solution contains 5–10 mg. of the compound per dosage unit.

4. A composition according to claim 1 in the form of a tablet.

5. A composition according to claim 4 wherein the tablet contains 25, 50 or 100 mg. of the compound per dosage unit.

6. A composition according to claim 1 in the form of a suppository.

7. A composition according to claim 6 wherein the suppository contains 50–100 mg. of the compound per dosage unit.

8. A composition according to claim 1 in the form of a syrup.

9. A composition according to claim 8 wherein the syrup contains 5 mg./ml. of the compound.

10. A composition as claimed in claim 1 wherein $R_1$, $R_2$ or $R_3$ is 2-piperidinoethoxy.

References Cited

UNITED STATES PATENTS 3,448,192  6/1969  Mauvernay _____ 260—268

STANLEY J. FRIEDMAN, Primary Examiner

U.S. Cl. X.R.

260—268